United States Patent [19]

Wallan

[11] Patent Number: 5,575,536
[45] Date of Patent: Nov. 19, 1996

[54] CHAIN RELEASE FOR TRUCK TAILGATE

[76] Inventor: Kenneth R. Wallan, P.O. Box 245, Miranda, Calif. 95553

[21] Appl. No.: 479,713

[22] Filed: Jun. 7, 1995

[51] Int. Cl.⁶ .................................................. B60P 1/28
[52] U.S. Cl. ............................ 298/23 R; 298/23 A
[58] Field of Search ......................... 298/23 R, 23 S, 298/23 A, 23 B, 23 D, 23 DF, 23 F, 19 V

[56] References Cited

U.S. PATENT DOCUMENTS

| | | | |
|---|---|---|---|
| 1,332,424 | 3/1920 | Carlson | 298/23 A |
| 1,395,028 | 10/1921 | Berg et al. | 298/23 A |
| 2,908,529 | 10/1959 | Davidson | 298/23 R |
| 2,943,753 | 7/1960 | Keys | 298/23 R |
| 4,032,192 | 6/1977 | Jensen | 298/23 A |
| 4,059,307 | 11/1977 | Neufeldt | 298/23 R |
| 4,962,966 | 10/1990 | Bumueller | 298/23 R |

OTHER PUBLICATIONS

Galion 89–F & FD Packages / 502–F Body.
Galion 83, 84 Packages / Body–Hoist Packages.

*Primary Examiner*—Karen Merritt
*Assistant Examiner*—Douglas Hess
*Attorney, Agent, or Firm*—Millen, White, Zelano, & Branigan, P.C.

[57] ABSTRACT

A dump truck spreads material to form a layer of material to form a structure such as a road by tilting a dump body pivoted on the truck and allowing a tailgate to open a gap through which the material flows as the dump truck moves forward. Typically, a pair of chains determine the width of the gap. In order to release the chains and allow the tailgate to swing freely if the material becomes jammed and does not freely flow through the gap, a pair of toggle-type chain releases are provided. The toggle-type chain releases comprise chain-retaining plates with slots therein for receiving one link of the chains. The retaining plates are rotatable from a chain-retaining position to a chain-releasing position. The toggles which operate the chain retaining plates include levers which are unitary with one link of the toggles and serve as operating handles which when pulled releases the chains.

6 Claims, 2 Drawing Sheets

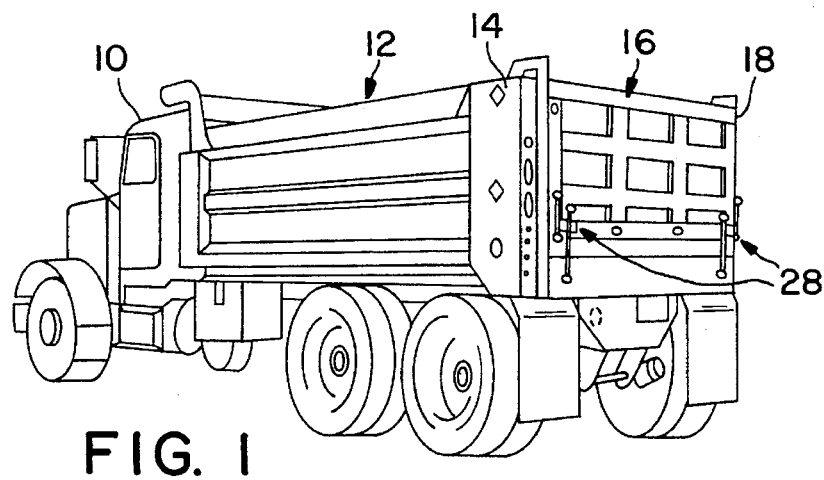
FIG. 1
PRIOR ART
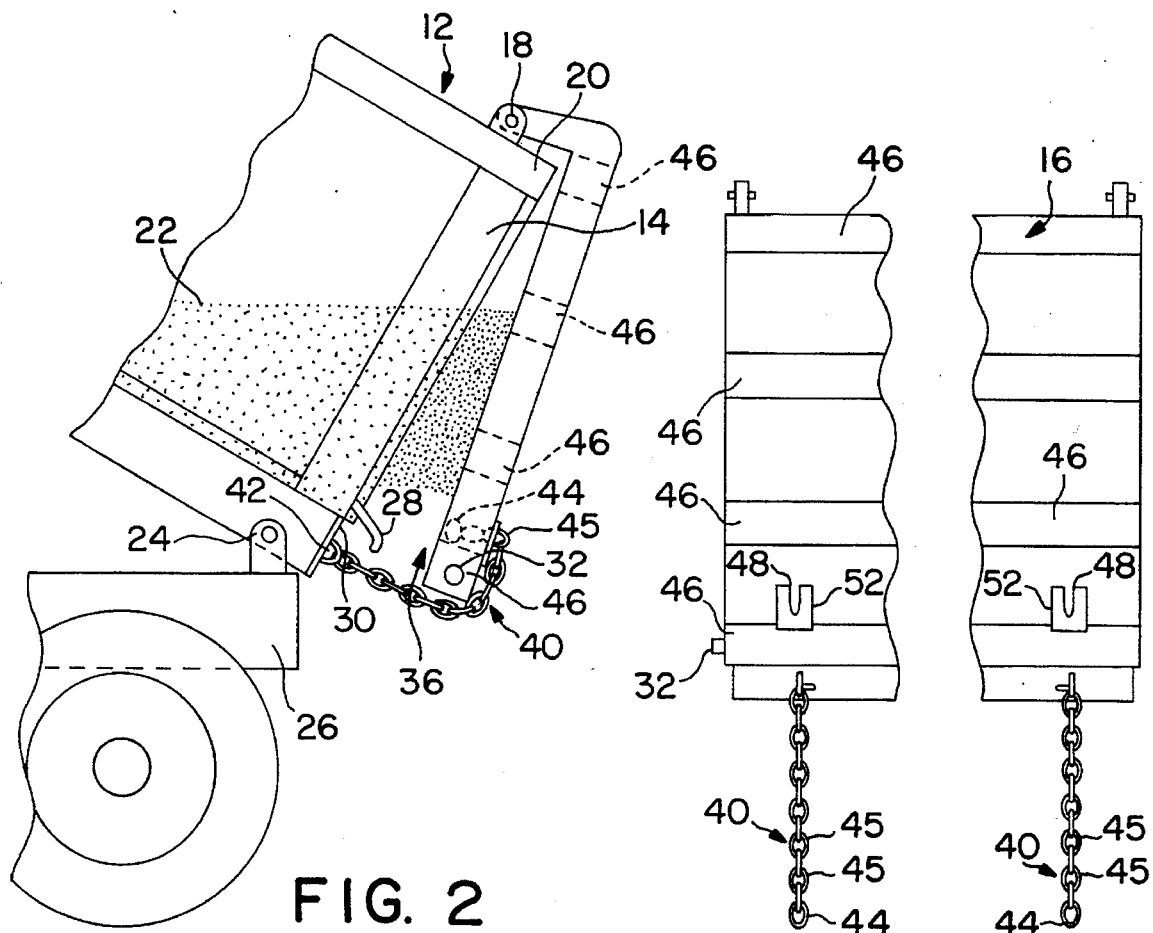
FIG. 2
PRIOR ART
FIG. 3
PRIOR ART

CHAIN RELEASE FOR TRUCK TAILGATE

FIELD OF THE INVENTION

This invention relates to dump truck tailgates. More specifically, this invention relates to mechanisms for latching chains used to hold tailgates in a partially open position.

BACKGROUND OF THE INVENTION

General purpose dump trucks are conventionally constructed with a load-carrying bed mounted for tilting movement. The load-carrying bed has a dump body with a rear opening closed by a tailgate pivoted thereto at the top of the dump body. The tailgate is held closed at the bottom of the dump body by grab hooks on opposite sides of the dump body. To unload the dump body, the forward end of the dump body is raised and the tailgate is released from its closed position, letting the material retained in the dump body flow by gravity through the opening in the rear of the body. The material is spread by moving the truck forward as the material is released. The thickness of the spread material is controlled by the speed of the truck and the size of the opening or gap defined by the bottom edge of the tailgate and the bottom edge of the opening in the dump body.

Two short chains are permanently attached to the underside of the dump body adjacent the opening. Welded to the tailgate, directly above each chain, is a plate which has vertical slots therein to accept any one of the chain links adjacent the free ends of the chains. Before the spreading process begins, the driver adjusts the size of the opening at the tailgate by selecting the appropriate chain link in each chain and retaining the link in the slot.

After adjusting the chains, the driver gets into the cab, raises the dump body and drives the truck forward. At the location where the driver wants to start spreading the load, he releases the grab hooks to allow the tailgate to open against the chains. If all goes well, the material will be spread smoothly and evenly. However, sticky material, chunks of mud, rocks, cold asphalt or other foreign objects can plug the opening and thus stop the flow of material. When this happens, someone must close the tailgate approximately 2 to 4 inches to release the chains from the slots so that the jamming material can be removed from the opening. In order to close the tailgate 2 to 4 inches, a shovel, large hand hammer or steel bar must be used to dislodge the jammed material from the opening. This results in considerable aggravation and lost time. The lost time can range from a few minutes to a few hours.

For the foregoing reasons, there is a need for an arrangement to facilitate releasing the chains without having to resort to using hand tools to dislodge materials from between the tailgate and dump body so that the tailgate can be moved a short distance toward the closed position in order to release tension on the chains.

SUMMARY OF THE INVENTION

It is a feature of the present invention to provide a new and improved arrangement for releasing chains which limit the size of the opening between a dump body and tailgate in order to dislodge jammed material from the opening.

In view of these features and other features, the present invention is directed to an improvement in dump trucks having a dump body for carrying a load, wherein the dump body is pivotally mounted on the truck frame and has a rear opening closed by a tailgate pivoted to the top of the dump body. At least one chain extends between the bottom of the bed and an anchoring location on the tailgate. The improvement is utilization of at least one chain release mounted on the tailgate, the chain release having a chain retainer for securing the chain to the tailgate. The chain retainer is movable from a chain-retaining position to a chain-releasing position upon unlocking a locking device provided to lock the chain retainer in the chain-retaining position. By using the present invention, when the bed is raised and the tailgate is partially open, the tailgate can be released to swing freely about the tailgate pivot in order to clear jams in the opening between the tailgate and dump body.

It is a further aspect of the present invention to utilize two chain releases so that the width of the opening can be adjusted by releasing one chain release and adjusting the length of chain held by that release and then releasing the other chain and simultaneously adjusting the length of that chain.

In still a further aspect of the invention, a toggle is utilized to retain the chain retainer in the chain-retaining position, the toggle being operated by a lever affixed to one link of the toggle.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a perspective view of a general purpose dump truck having a dump body with a tailgate and chain hooks;

FIG. 2 is a side view of the dump truck of FIG. 1 configured in accordance with the prior art arrangement in showing the tailgate partially open;

FIG. 3 is a fragmentary rear view showing the arrangement of the prior art with chains released and showing the location of chain release mechanisms of the present invention;

DETAILED DESCRIPTION

Figure 4:
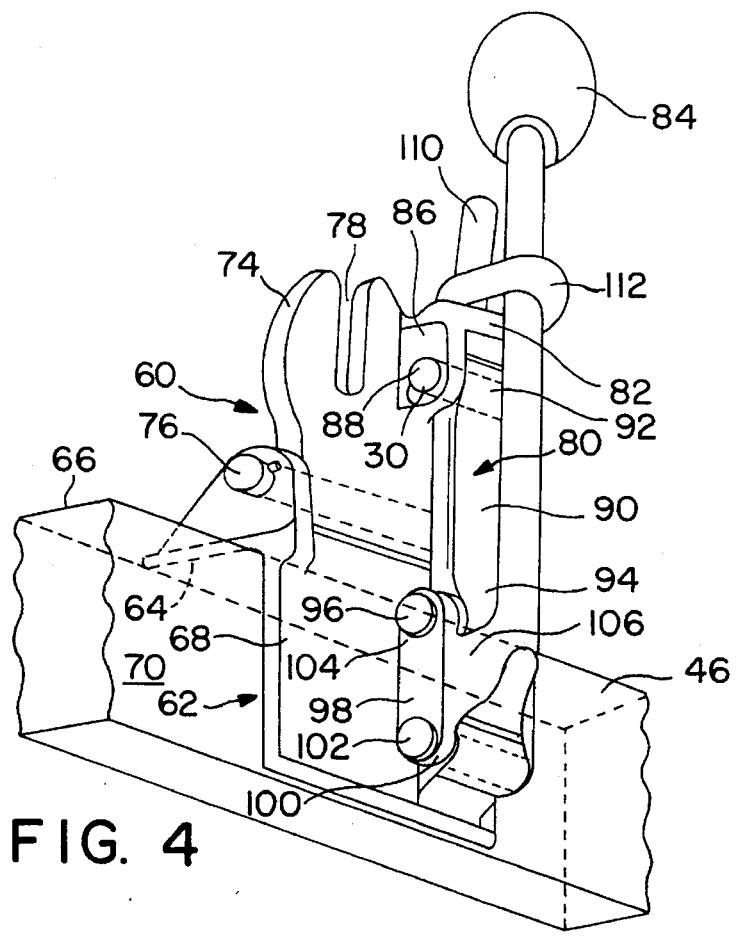
FIG. 4 is a perspective view of a chain release configured in accordance with the principles of the present invention in a chain-retaining position.

Referring now to FIGS. 1 and 2, there is shown a general purpose dump truck 10 having a dump body 12 mounted thereon which has a rear opening 14 closed by a tailgate 16. The tailgate 16 is pivoted by pivots 18 proximate the top rear edge 20 of the dump body 12.

In order to spread material 22, such as asphalt stored within the dump body 12, the front end of the dump body is raised to pivot the dump body about a pivot 24 on the frame 26 of the dump truck 10. After tilting the dump body 12, hooks 28 pivoted on the dump body proximate the bottom 30 of the dump body are disengaged from keeper pins 32 at the bottom of the tailgate. When the dump body 12 is raised, the tailgate 16 pivots about the pivots 18 with respect to the rear opening 14 of the dump body to create a gap 36. The width of the gap 36 is determined by the length of chains 40. One end on each of the chains 40 is anchored to an anchor point 42 at the lower end 30 of the dump bed 12 while the free end 44 has links 45 adjacent thereto which are anchored to one of the braces 46 of the tailgate 16. As the truck 10 is driven forward, the material 22 falls through the gap 36 and is spread over a surface being covered, such as a road bed.

As seen in FIG. 3, chains 40 are retained in slots 48 in brackets 52 which are fixed to the cross-brace 46. The width of the gap 36 is controlled by whichever of the individual links 45 are inserted in the slots 48.

If the gap 36 becomes jammed by bonding together of the material 22 at the gap so that the material will not fall through the gap, it is necessary to remove the material by utilizing a convenient implement such as a No. 2 shovel. The material 22 must be removed because it presses tightly against the tailgate tensioning the chains 40. In order to release the jam, it is necessary to close the gap 36 a distance of 2 to 4 inches so that the retained links 45 can be pulled out of the slots 48. As has been explained previously, this is a time-consuming, aggravating undertaking.

Figure 5:
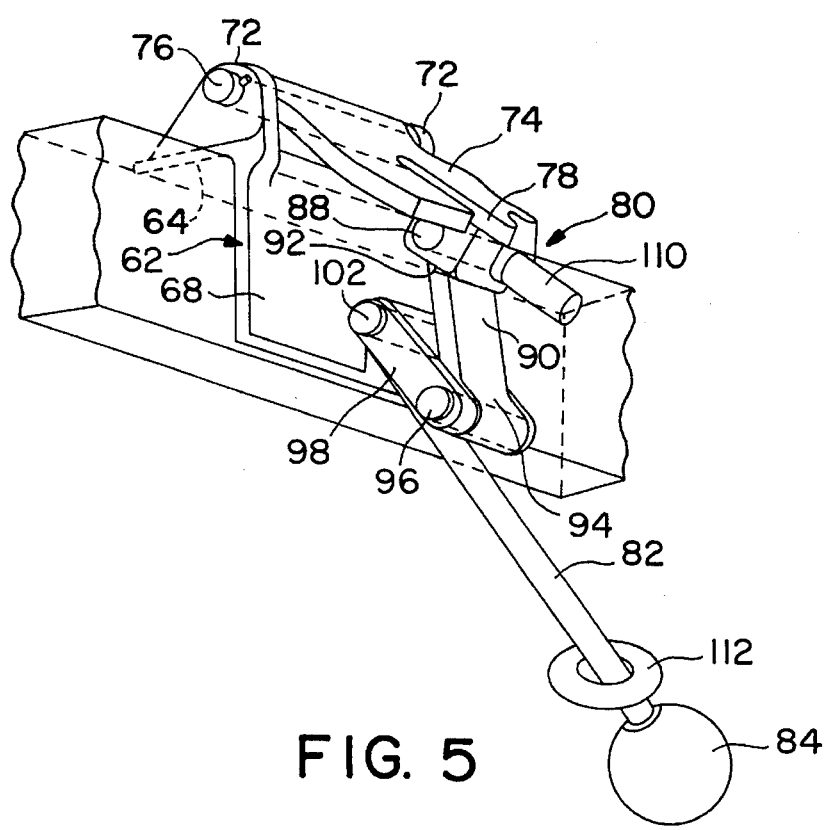
FIG. 5 is a perspective view of a chain release configured in accordance with the present invention and shown in a chain-release position.

Referring now to FIGS. 4 and 5, in the present invention a chain release 60, configured in accordance with the principles of the present invention, is welded or otherwise secured to the lower cross brace 46 of the tailgate 16. The chain release 60 is mounted on the lower cross brace 46 by an L-shaped base 62 which is welded, bolted or otherwise mounted on the cross brace 46. The L-shaped base 62 has a first base plate 64 which extends across the horizontal or top surface 66 of the cross brace 46 and a vertical plate 68 which extends across the vertical face 70 of the cross brace. Projecting upwardly from the plate 64 are lugs 72 between which is mounted a chain-retaining plate 74 by a pivot 76. Chain-retaining plate 74 has a slot 78 therein which functions to retain one of the links 45 (see FIG. 3) therein in the same manner as the slot 48 in the bracket 52 of FIG. 3.

The chain release 60 of FIGS. 4 and 5 pivots from the FIG. 4 to the FIG. 5 position to release the chain 40 retained in the slot 78. This is accomplished by opening a toggle mechanism 80 operated by lever 82. The lever 82 has a knob 84 at the free end thereof to provide a convenient grip.

Projecting from the chain-retaining plate 74 are a pair of lugs 86 (only one of which is shown) which are positioned laterally of the slot 78. The lugs 86 retain a pivot pin 88 therebetween for a first link 90 which is pivoted at a first end 92 to the chain-retaining plate. A second end 94 of the first link 90 is pivoted by a pivot 96 to a second link 98, which second link 98 has a first end 100 pivoted by pivot pin 102 to the base plate 68 and a second end 104 pivoted to the first link 90. Integral with the second link 98 is the lever 82 which is connected to the second link by a lug portion 106.

Projecting from the top of each of the lugs 86 on the chain release plate 74 is a pin 110 and disposed around the lever 82 is a metal loop, 112 which is retained on the lever 82 by the knob 84. As is seen in FIG. 4, the loop 112 slips over the pin 110 and locks the chain-retaining plate 74 in the chain-retaining position, which is essentially the position of the fixed brackets 52 in FIG. 3. Preferably, the pin 110 and lever 92 are not parallel so that as the loop 112 is pushed down the pin and lever are drawn together so as to take up slack and tighten everything up so that the chain release 60 does not rattle. Preferably, the toggle 80 is over center with the pivot point 96 disposed inside a line drawn between the pivot points 88 and 102. In other words, the pivot 96 is closer to the plate 68 than a line drawn between the centers of rotation of the pins 88 and 102. Consequently, tension on the chain 40 (shown in FIGS. 1–3) in the slot 78 exerts a force which tends to keep the chain-retaining plate 74 in the chain-retaining position.

When the link 112 is slid on the lever 82 upwardly far enough to clear the end of the pin 110, then the lever 82 can be pulled from the FIG. 4 position to the FIG. 5 position. As this happens, the link 98 is pivoted about the pivot 102 and if the pivot 96 is over center, it is pulled outwardly so that the toggle 80 collapses to the FIG. 5 position where the links 90 and 98 extend at acute angles with respect to one another rather than being substantially in line. The chain 40 (see FIG. 3) is then free to slide out of the slot 78 in the chain-retaining plate 74. Accordingly, if the tailgate 16 is jammed and the chain 40 tensioned, the chain 40 can be released without having to utilize a tool to dislodge material jammed against the tailgate 16.

Typically, two chain releases 60 are utilized to retain the tailgate 16. It is therefore possible to adjust the chains 40 by releasing one of the chains and selecting a link 45 closer to the end link 44 and then using the lever 82 to move the chain-retaining plate 74 from the FIG. 5 to the FIG. 4 position. After the toggle 80 goes over center and the lock ring 112 is slid over the pin 110, the other chain release 60 is operated to release the other chain which is then reset while returning the chain release 60 from the FIG. 5 to the FIG. 4 position. With the prior art approach, it was not possible to adjust the gap 36 in this way once the material 22 had pressed against the tailgate without first removing material proximate the tailgate.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a dump truck having a dump bed pivoted on a truck frame, the dump bed having a dump body for carrying a load, the dump bed being pivotal on the truck frame, wherein the dump body has a rear opening with a bottom and a top, the rear opening being closed by a tailgate pivoted at the top and selectively openable at the bottom to release the load through an opening between the tailgate and the dump body; at least one chain extending between the bottom of the bed and an anchoring location on the tailgate, the improvement comprising:

at least one chain release mounted to the tailgate at the anchoring location; the chain release including a chain retainer for receiving the chain of the tailgate; a pivot for mounting the chain retainer on the tailgate for allowing the chain retainer to pivot with respect to the tailgate from a chain retaining position to a chain release position, a toggle device for locking the chain retainer in the chain retaining position when locked and for allowing the chain retainer to pivot to the chain releasing position when unlocked, whereby when the dump body is raised to release the load and the tailgate is partially open, the tailgate can be released to swing free about the tailgate pivot in order to clear jams in the opening between the tailgate and dump body.

2. The improvement of claim 1, wherein the toggle includes a first link and a second link, each having first and second ends with the first link being pivoted at the first end thereof to the chain retainer and at the second end to the second end of the second link, the second link being pivoted with respect to the tailgate wherein the toggle is collapsed to hold the chain retainer in the retaining position when the first and second links are substantially in line and opened when the first and second links are at an acute angle with respect to one another to allow the chain retainer to release the chain.

3. The improvement of claim 2, further including an operating lever attached to the second link for moving the toggle from the collapsed to the opened condition.

4. The improvement of claim 3, wherein the toggle includes a pin projecting from the chain retainer and a loop around the operating lever, the loop fitting over the pin to lock the operating lever to the chain retainer to prevent rattling and wear when no load is on the chain.

5. The improvement of claim 4, wherein there are two chain releases attached to the tailgate.

6. The improvement of claim 1, wherein there are two chain releases attached to the tailgate.

* * * * *